March 22, 1949.     A. J. GARVEY     2,464,974

HUSKING ROLL

Filed July 23, 1945

INVENTOR.
Andrew J. Garvey
BY
Sam J. Slotsky
ATTORNEY

Patented Mar. 22, 1949

2,464,974

UNITED STATES PATENT OFFICE 2,464,974

HUSKING ROLL

Andrew J. Garvey, Omaha, Nebr.

Application July 23, 1945, Serial No. 606,686

1 Claim. (Cl. 130—5)

My invention relates to a husking roll.

An object of my invention is to provide a husking roll which efficiently grips the material to be husked from the corn.

A further object of my invention is to provide a husking roll of resilient gripping material, and to provide in combination therewith, a pair of end members having a certain construction to eliminate the end wear of the husking rolls.

A further object of my invention is to provide in such end members features for preventing the entrance of dirt and other material into the end bearings supporting the roll.

A further object of my invention is to provide a pair of such end members which include keying elements so arranged to provide an efficient gripping effect on the discs making up the roll, and to provide an installation feature to automatically provide such a result.

A further object of my invention is to provide such end members which will maintain a uniform diameter to the roll regardless of the extent of usage thereof.

Figure 1:
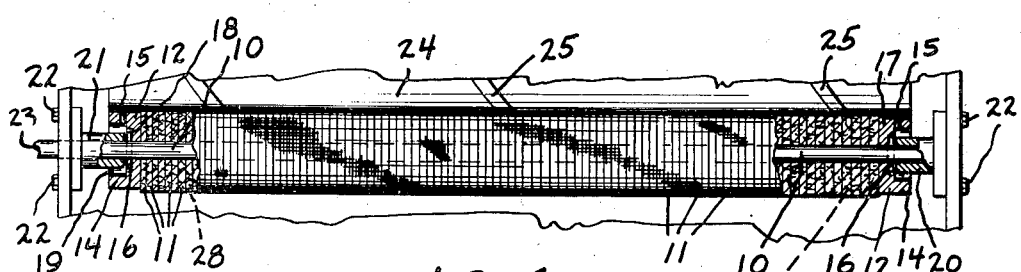
Figure 2:
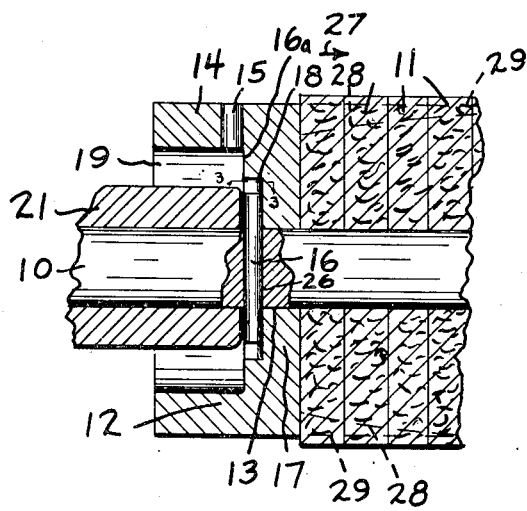
Figure 3:
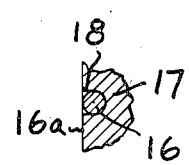

With these and other objects in view, my invention consists in the construction, arrangement, and combination of the various parts of my device, whereby the objects contemplated are attained, as hereinafter more fully set forth, pointed out in my claim, and illustrated in the accompanying drawings, in which:

Figure 1 is a plan view taken partially in section of the roll of my construction with its companion roll, Figure 2 is an enlarged detail section of one of the end members and the members attached adjacently thereto, and Figure 3 is a section taken along the lines 3—3 of Figure 2.

I have used the character 10 to designate a lengthened shaft, which shaft receives a plurality of ring shaped fabric members 11, the members 11 having central openings for receiving the shaft. Attached at either end of the shaft 10 are the special washer members 12 which include an opening 13 for engaging the shaft 10, the members 12 also including the cylindrical annular flanges 14. Passing through the flange 14 is an opening 15 which is adapted to freely receive a pin 16, the opening 15 having one side substantially flush with the portion 16a.

Formed in the main body 17 of the member 12 is a channel or groove 18 which is adapted to receive the cylindrical pin 16 so that one edge of the pin is directly coincident with the surface 16a, so that the pin will not project beyond the surface 16a. This construction provides the hollow portion in the washer at 19. The fabric discs 11 are slightly larger in diameter than the diameter of the washers 12 when the roll is first formed. The end bearings which receive the shaft 10 are indicated by the characters 20 and 21 which bearings are suitably bolted either as at 22 or in any other customary manner, one end of the shaft at 23 being attached to a suitable sprocket or gear for driving the same. The companion roll or the roll which frictionally engages the roll 10 is indicated by the character 24 and includes the usual ribs 25, etc.

The discs 11 are firmly secured in the following manner. One of the end washers 12 (such as the right hand washer shown in Figure 1) is first positioned so that the opening 15 is directly above the cylindrical key opening 26 of the shaft 10. The key is then dropped through the opening 15 and into the opening 26, and the washer 12 is then moved outwardly until the key 16 passes into the receiving groove 18. Next, all of the discs are assembled on the shaft 10 until the shaft is filled with the same, and then the other washer 12 is pressed inwardly against the assembled discs in the direction of the arrow 27 (see Figure 2) until the opening 15 coincides with the opening 26. The key is then put in place through the opening 15 and thence is placed into the opening 26. The washer is then allowed to spring back until the groove 18 receives the pin 16. The normal resiliency of the discs will permit the above operation and will yet maintain all of the discs in tight engagement. Such discs can be cut from fabric or other stock having similar characteristics. The above arrangement is then assembled in its proper position next to its companion roll, replacing the bearings, etc.

Since the rolls 10 are of a fairly substantial length, and travel at a relatively high speed, the roll usually whips and bends due to the flexure of the central shaft, and if the end washers 12 were not provided, which washers are made of relatively hard material such as steel or the like, the ends of the roll would be worn approximately to the shape as indicated by the dotted line character 28, in other words, the ends would be worn down. The present structure however, protects the ends of the rolls by preventing the contacts caused by such flexure, either by the roll itself, or the adjacent roll. During use the projecting portions of the discs will be worn down to a cylindrical surface as indicated by the character 29 which surface is flush with the peripheral boundaries of the flanges 14. It will be noted that the companion roll 24 bears against the washers at its ends resulting in the effects above described. It will be further noted that the method of keying the arrangement efficiently locks the various members, that the washer protects the bearing, and that the keying method provides an easy method of assembly. It will be further noted that the special keying arrangement prevents the key 16 from contacting against the ends of the bearings 20 or 21, since the key 16 is recessed beneath the surface 16a.

It will now be seen that I have provided all of the advantages mentioned in the objects of my invention with further other advantages being readily apparent.

Some changes may be made in the construction and arrangement of the parts of my invention without departing from the real spirit and purpose of my invention, and it is my intention to cover by my claim any modified forms of structure or use of mechanical equivalents which may be reasonably included within their scope.

I claim as my invention:

A husking roll comprising a plurality of fabric discs, said discs being closely engaged with each other, washer members at the ends of said discs, said washer members being made of hard material and being substantially the same diameter as said discs to protect the end discs against wearing thereof, said washer members having central cavities therein for receiving bearings within the same for protecting said bearings, said roll including a shaft upon which said discs and washers are mounted, means for keying said washers to said shaft, said keying means including pins, depressed channels in said washers for receiving said pins, said washers having recessed faces flush with the outer edges of said pins when said pins are placed in said channels to prevent abutment with the ends of said bearings, said washers having annular flanges surrounding said cavities, said flanges having openings therein for receiving said pins for assembly thereof to said shaft, said shaft having pin receiving openings, said flange openings being positioned to one side of said channels whereby pressure of said washers against the resilient fabric discs will provide alignment of said flange openings with the shaft pin openings, and whereby release of pressure of said washers will cause said channels to receive said pins.

ANDREW J. GARVEY.

REFERENCES CITED

The following references are of record in the file of this patent:

UNITED STATES PATENTS

| Number | Name | Date |
| --- | --- | --- |
| 1,382,792 | Leister | June 28, 1921 |
| 1,764,686 | Kuhlman | June 17, 1930 |
| 2,266,506 | Morse | Dec. 16, 1941 |
| 2,416,123 | Siemen | Feb. 18, 1947 |
| 2,416,124 | Siemen | Feb. 18, 1947 |